United States Patent

Genovese

[15] 3,662,359

[45] May 9, 1972

[54] METHOD AND APPARATUS FOR CREATION OF CYLINDRICAL, SINGLE WALL DOMAINS

[72] Inventor: Eugene R. Genovese, Yorktown Heights, N.Y.

[73] Assignee: International Business Machines Corporation, Armonk, N.Y.

[22] Filed: Dec. 31, 1970

[21] Appl. No.: 103,048

[52] U.S. Cl. ..................................340/174 TF, 340/174 YC

[51] Int. Cl. ..........................................................G11c 11/14

[58] Field of Search ..........................340/174 TF; 252/62.57

*Primary Examiner*—James W. Moffitt

*Attorney*—Hanifin & Jancin and Jackson E. Stanland

[57] ABSTRACT

A method and apparatus for creation of cylindrical, single wall domains in selected locations in a magnetic sheet, such as orthoferrite or garnet films. A bias (stabilizing) magnetic field is applied normal to the magnetic sheet to saturate the sheet in one direction so that no reversely magnetized domains are present in the storage area. A localized magnetic field normal to the magnetic sheet but oppositely directed with respect to the bias field is then created. This localized field is produced by the action of an in-plane field and a bar of magnetic material on the sheet, or by a small current loop. The bias field is then reduced until a domain in nucleated at the site of the localized field. The domain will nucleate when the net reversely directed local field is greater than the nucleation field $H_n$ at that location. The bias field is then increased to regulate the diameter of the domain produced. Means are provided to create a variable bias field normal to the sheet and to create an oppositely directed variable localized field at selected locations in the shett.

19 Claims, 7 Drawing Figures

INVENTOR
EUGENE R. GENOVESE

BY J. E. [signature]
AGENT

METHOD AND APPARATUS FOR CREATION OF CYLINDRICAL, SINGLE WALL DOMAINS

BACKGROUND OF THE INVENTION

1. Field of the Invention

This invention relates to a simple method and apparatus for nucleation of bubble domains selectively at desired locations within a magnetic sheet, without requiring extensive power inputs, even when the magnetic sheet is initially saturated.

2. Description of the Prior Art

Cylindrical, single wall domains are known, and devices using these domains are also known. For an example of these devices, reference is made to Perneski, "The Propagation of Cylindrical Magnetic Domains," IEEE Transactions on Magnetics, Vol. MAG-5, No. 3, September, 1969, Page 554. Design of any device using bubble domains is confronted with the problem of production of the initial bubble domain. It is known that domains can be replicated (split) to produce a plurality of domains, but only a few general methods are known for producing the first domain. Further, it is very difficult to nucleate new domains in a saturated magnetic sheet. The magnetic materials generally used for bubble domain devices have high nucleation fields and low wall motion fields.

One method for initial production of cylindrical domains is that described in U. S. Pat. No. 3,460,116. In that reference, a "mother" bubble domain is produced by heating a magnetic material to a temperature at which positive and negative domains are formed in the magnetic sheet when it latter cooled to room temperature. When the magnetic sheet is heated above a Neel (or Curie) temperature and then cooled, the material will be demagnetized into snake-like domain patterns. If a bias field directed normal to the sheet is then applied, these serpentine domains will shrink into cylindrical domains (A. H. Bobeck, Bell System Tech. Journal, 46, 1901–1925, 1967).

Another method for producing cylindrical domains involves the application of a short pulse approximately 50 nanoseconds of a magnetic field normal to the magnetic platelet (J. Nemchik, Journal Applied Physics, 40, No. 3, 1086–7, March 1969).

U. S. Pat. No. 3,506,974 describes the use of a laser beam to write cylindrical domains in a magnetic sheet. The laser beam locally raises the temperature of the magnetic sheet and, if a magnetic field perpendicular to the sheet is provided as the temperature is reduced, cylindrical domains will form.

The prior methods and apparatus for nucleating domains involve heating steps using light beams or ovens, which are disadvantageous. Further, only the method described in U. S. Pat. No. 3,506,974 will provide domains at selected locations. These prior techniques for production of bubble domains are not simple and easily adapted for use on magnetic chips in which a variety of devices may be present. They all require high power inputs and are not easily used when a magnetic sheet is saturated.

Accordingly, it is an object of this invention to provide a method for generating bubble domains which is simple, inexpensive, and will provide domains anywhere on a magnetic sheet.

It is another object of this invention to provide a method for generating bubble domains which requires only minimum power inputs.

It is still another object of this invention to provide a method for producing bubble domains which is simple and reliable and will produce domains even after the magnetic sheet is saturated.

A further object of this invention is to provide a simple apparatus which will produce bubble domains using only the usually available power or magnetic field inputs required for propagation of domains in the magnetic sheet.

These and other objects, features and advantages will be more apparent from the following more particular description of the preferred embodiments of the invention as illustrated in the accompanying drawings.

SUMMARY OF THE INVENTION

Cylindrical magnetic domains having a magnetization direction normal to the sheet in which they are produced, can be selectively nucleated at any desired location in the sheet. A bias magnetic field $H_Z$ is just applied normal to the sheet (which can be an orthoferrite or a garnet, for example) to magnetically saturate the sheet so that no reversely magnetized domains are present. A localized magnetic field $H_Z$ oppositely directed to the bias field is then created at a selected location in the magnetic sheet. When the bias field is reduced so that $H_Z–H_Z$ is greater than or equal to the nucleation field $H_N$ at that location, a cylindrical domain will be nucleated at that location.

Means are provided for establishing the variable bias field and the localized field.

DETAILED DESCRIPTION OF THE EMBODIMENTS

Figure 1:
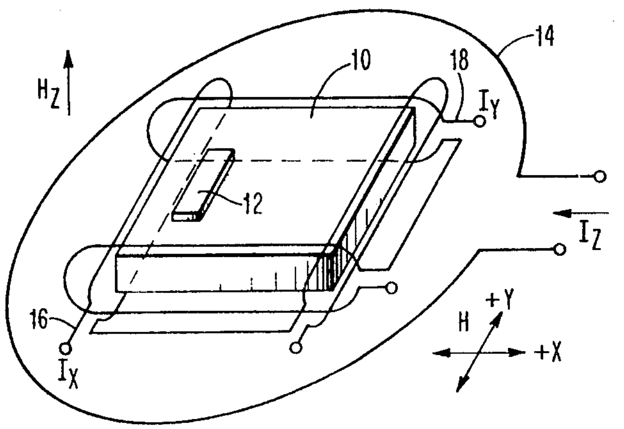
FIG. 1 is an illustration of a magnetic sheet and various magnetic field producing means used to nucleate domains at preferred locations.

FIG. 1 shows a magnetic sheet 10 suitable for propagation of cylindrical domains therein. The magnetic sheet is usually an orthoferrite or a garnet, as is well known in the art. Located on sheet 10 is a bar 12 of magnetically soft material, such as permalloy. As will be apparent later, the thickness, width, etc. of bar 12 will be determined by the strength of the localized magnetic field to be produced by the bar 12.

Located around sheet 10 are various means for producing an in-plane magnetic field H and a bias (stabilizing) field $H_Z$ normal to the sheet 10. In FIG. 1, the means for creating the in-plane field H and the bias field $H_Z$ are current carrying coils. The bias coil 14 is in the plane of magnetic sheet 10 and produces a bias field $H_Z$ in response to a circulating current $I_Z$. Current $I_Z$ is variable so that the bias field $H_Z$ is variable in magnitude. Magnetic fields can be produced in ±Z directions. X and Y coils 16 and 18 respectively are used to provide components of a rotating in-plane field H. These coils carry currents $I_X$ and $I_Y$ which are also variable. Depending upon how these coils are pulsed, the field H will be directed in the ±X direction or the ±Y direction. Thus, by proper selection of current $I_X$ and $I_Y$, it is possible to produce a magnetic field at the ends of permalloy bar 12. That is, it is possible to magnetize bar 12 with a planar field along its length.

Figure 1A:
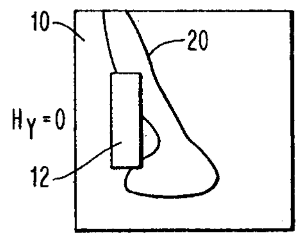
FIG. 1A shows the attraction of a permalloy bar to a reverse domain.

Initially, domains are randomly located on the magnetic sheet 10. These domains will be attracted to a permalloy bar 12, as shown in FIG. 1A. Where domain 20 is attracted to bar 12. However, random domains are not useful, since it is desired to start with a domain-free sheet 10, then form a domain at selected locations, when desired.

Figure 1B:
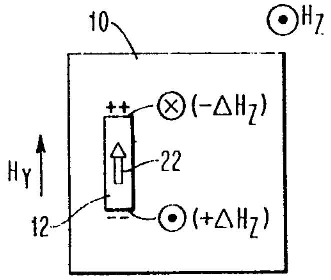
FIGS. 1B–1D show the creation of the cylindrical magnetic domain at the end of a permalloy bar located on the magnetic sheet, as shown in FIG. 1.
Figure 1C:
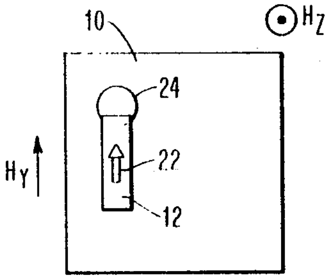
Figure 1D:
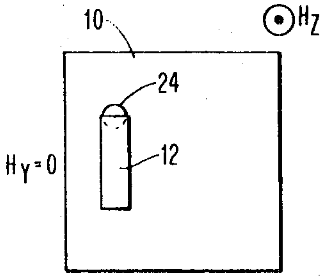

To understand the operation of the device of FIG. 1, reference is made to FIGS. 1B–1D, which illustrate the method of this invention. Initially, the storage area of magnetic sheet 10 is cleared of domains by applying a bias field $H_Z$. No reversely magnetized domains will remain in sheet 10.

In FIG. 1B, an in-plane bias field H has value $+H_Y$, and bar 12 will be magnetized in the direction of arrow 22. Magnetization of bar 12 will create positive magnetic charges on one end of bar 12 and negative magnetic charges on the other, as shown in FIG. 1B. Consequently, a stray magnetic field will be produced at each end of the permalloy bar and this stray magnetic field will have a component in the Z direction. At the top end of bar 12 the component $- H_Z$ produced by the stray magnetic field of bar 12 will be oppositely directed to the bias field $H_Z$. At the lower end of bar 12, the component $+ H_Z$ will be in the direction of the bias field $H_Z$.

The bias field $H_Z$ is then reduced in magnitude until a cylindrical domain 24 is nucleated at the top end of bar 12. The cylindrical domain will nucleate when $H_Z$–$H_Z$ is greater than the nucleation field $H_n$ at that location. Thus, in FIG. 1C, the bias field $H_Z$ is reduced while the permalloy bar 12 is magnetized by the in-plane magnetic field $H_Y$, thereby forming cylindrical domain 24. After this, the bias field $H_Z$ is increased in magnitude to reduce the diameter of domain 24 to that desired (FIG. 1D).

Reversing the magnetization of bar 12 (by creating an in-plane magnetic field $-H_Y$ and repeating this sequence of steps, will nucleate a cylindrical domain at the other end of bar 12. This method can be used to nucleate a cylindrical domain on a domain generator (rotating permalloy disk) or at any specific location on the magnetic sheet. For example, in T and I bar shift registers cylindrical domains can be nucleated on the domain generator and on one end of a T bar. The shift register is cleared leaving only the cylindrical domain on the domain generator. Operation of the shift register can then begin.

The bar 12 is generally permalloy and has a thickness and width which is sufficient to provide a localized field in the Z direction which is greater than the nucleation field of the material at that location. The diameter of the localized magnetic field is approximately the same size as the resulting cylindrical domain. As an example, permalloy bars 5 mils + 50 mils, 1 micron thick have been used to nucleate cylindrical domains in $Gd_{0.9}$ $Tm_{0.1}$ Fe $O_3$. The localized Z field was approximately 55 Oe.

If the nucleation field of the magnetic sheet is particularly large, it may be necessary to create a defect in the material at the site of the localized magnetic field. To do this, the material is subjected to a laser beam at that location, or an imperfection can be created by etching (for example). The defect is any magnetic non-uniformity which interrupts the regular path of the flux lines in the material. For instance, a "dent" in the magnetic sheet is a sufficient defect to create an area having a lower nucleation threshold. Any defect giving rise to a magnetic non-uniformity is sufficient; a structural defect (dislocation, etc.) need not be produced. Provision of a defect is quite simple and can be selectively provided in the material so that domains can be generated anywhere in magnetic sheet 10. The permalloy bar 12 will be located so that the localized field created by the bar will be present at the site of the defect.

Figure 2:
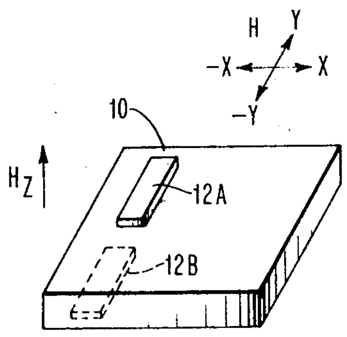
FIG. 2 shows an alternate embodiment for creating cylindrical domains at selected locations on the magnetic sheet.

FIG. 2 is an alternate embodiment in which the localized magnetic field can be increased in strength by using a double overlay of soft magnetic material. In this embodiment, the means for producing the bias field $H_Z$ and the in-plane H are not shown, for reasons of space. It should be recognized that these means are that shown in FIG. 1, or the equivalent thereof.

Magnetic bars 12A and 12B (usually permalloy) are located on the top and bottom surfaces of sheet 10, respectively. Generally, bars 12A and 12B do not overlap one another, but if there is magnetic curling due to the small length of these bars, it may be desirable to have some overlap of these bars. The purpose of having two permalloy bars 12A and 12B is to provide an increased localized magnetic field in the Z direction. In this manner, it is more likely that the nucleation threshold field of the material at the site of this localized field will be exceeded. The use of a double permalloy overlay for the purpose of providing increased magnetic fields is shown in a copending application Ser. No. 103,244 filed Dec. 31, 1970, assigned to the same assignee as the present invention. That application describes the use of overlap between elements 12A and 12B when magnetic curling is present, and reference is made to that application for a more detailed discussion of these considerations. For the present, it is sufficient to say that a magnetic field H in the −Y direction will create a very strong localized magnetic field in the Z direction between elements 12A and 12B. This localized field will oppose the bias field $H_Z$ and is used to create cylindrical domains at the location between elements 12A and 12B.

Figure 3:
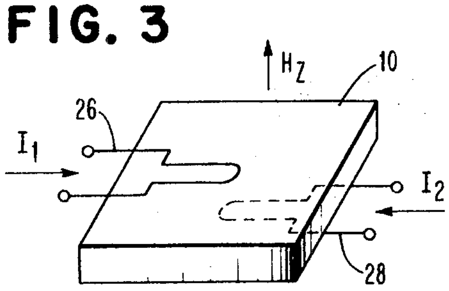
FIG. 3 shows a current loop embodiment for creation of cylindrical domains at desired locations on the magnetic sheet.

FIG. 3 is an alternate embodiment in which two current loops are used to provide the concentrated localized magnetic field which opposes the bias field $H_Z$. Current loop 26 has a variable input current $I_1$ and is located on the top surface of sheet 10. Current loop 28 has a variable current $I_2$ and is located on the bottom surface of sheet 10. In a manner completely analgous to that of FIG. 2, increased magnetic field concentration between current loops 26 and 28 is achieved in this configuration. In addition, the bottom current loop 28 is not always needed in the practice of this invention. In this case, the top current loop 26 will operate similarly to the device of FIG. 1, in that a sufficiently strong stray magnetic field will be produced by current loop 26 which will oppose the bias field $H_Z$ at the end of the current loop.

What has been shown is a very simple method and apparatus for generating magnetic domains at any desired location. Generally, the magnetic sheet is saturated with a normal bias field, which clears all domains in the storage area of the magnetic sheet. This is the area in which the storage function and other functions are undertaken. If a localized magnetic field in a direction opposite to the bias field is created at the end of the permalloy bar or current loop, a reverse domain will be generated at this location as the bias field is reduced. The localized magnetic field is then reduced and the bias field is increased to reduce the cylindrical domains so produced to the desired diameter.

As is apparent, this method and apparatus is very simple and will provide localized domains wherever desired. Because of this, the apparatus can be easily integrated into normal cylindrical domain devices and can use only the magnetic field usually present for operation of these devices.

What is claimed is:

1. A method for nucleating a cylindrical magnetic domain in a magnetic sheet, said domain having a magnetization normal to the plane of said sheet, comprising the steps of:

magnetically saturating said sheet by a first magnetic field $H_z$ normal to said sheet;

producing a localized magnetic field $H_p$ oppositely directed to said first magnetic field;

reducing the magnitude of said first magnetic field to a value at which $H_p$-$H_z$ is at least equal to $H_n$, where $H_n$ is the nucleation field of said sheet at the location of said $H_p$ field, thereby nucleating a cylindrical domain at the site of said localized field.

2. The method of claim 1, having the further step of increasing the magnitude of said first field to regulate the diameter of said nucleated domain.

3. The method of claim 1, where said localized field is created by the action of an in-plane magnetic field on a magnetic element located on said sheet.

4. The method of claim 3, where said in-plane field is used to propagate said nucleated domains in said sheet.

5. The method of claim 1, where said localized field is produced by a current loop in the plane of said sheet.

6. The method of claim 1, where said localized field is produced by magnetic elements located on both sides of said sheet.

7. The method of claim 1, where said localized field is produced by current loops in the plane of said sheet, said loops being located on opposite sides of said sheet.

8. The method of claim 1, further including the step of creating a magnetic non-uniformity at the site of said localized field before said localized field is produced.

9. A method for nucleating a cylindrical magnetic domain in a magnetic sheet, said domain having a magnetization normal to the plane of said sheet, comprising the steps of:

establishing a magnetic non-uniformity in said sheet at a desired location;

magnetically saturating said sheet;

producing a localized magnetic field at the location of said non-uniformity, said localized field being at least equal in magnitude to the nucleation field of said sheet at said location, thereby nucleating said domain at said location.

10. The method of claim 9, where said localized field is created by the magnetization of a magnetic element located on said sheet.

11. The method of claim 9, where said localized field is produced by the action of a current through a conductor loop whose plane is substantially parallel to the plane of said sheet.

12. The method of claim 9, where said localized field is produced by a magnetic field existing between magnetic elements located on both sides of said magnetic sheet.

13. An apparatus for producing cylindrical domains at desired locations in a magnetic sheet capable of supporting said domains, comprising:

means for producing a uniform magnetic field normal to said sheet of variable magnitude sufficient to magnetically saturate said sheet;

means for producing a localized magnetic field normal to said sheet and oppositely directed to said uniform field, said local field being sufficient to enable nucleation of a domain at the site of said localized magnetic field when said uniform field is reduced in magnitude.

14. The apparatus of claim 13, further including means for creating a localized magnetic non-uniformity in said sheet.

15. The apparatus of claim 13, where said means for producing said localized field comprises a magnetic element located on said sheet, and a means for producing a magnetic field to magnetize said element.

16. The apparatus of claim 13, where said means for producing said localized field comprises a current loop whose plane is parallel to the plane of said magnetic sheet.

17. An apparatus for producing cylindrical magnetic domains at desired locations in a magnetic sheet capable of supporting said domains, comprising:

means for producing a localized magnetic non-uniformity in said sheet;

means for producing a uniform magnetic field normal to said sheet of magnitude sufficient to magnetically saturate said sheet;

means for producing a magnetic field oppositely directed to said uniform field at the location of said magnetic non-uniformity, said localized field being of magnitude sufficient to nucleate a cylindrical domain at said non-uniformity.

18. The apparatus of claim 17, where said means for producing a localized field is comprised of at least one magnetic element located on said sheet.

19. The apparatus of claim 17, where said means for producing a localized field is comprised of at least one current carrying conductor loop whose plane is parallel to said magnetic sheet.

* * * * *